(12) United States Patent
Baxter, Jr.

(10) Patent No.: US 7,186,199 B1
(45) Date of Patent: Mar. 6, 2007

(54) TORQUE VECTORING GEAR DRIVE APPARATUS

(75) Inventor: Ralph Woodward Baxter, Jr., Fort Wayne, IN (US)

(73) Assignee: Torque-Traction Technologies. LLC., Maumee, OH (US)

( * ) Notice: Subject to any disclaimer, the term of this patent is extended or adjusted under 35 U.S.C. 154(b) by 22 days.

(21) Appl. No.: 10/975,709

(22) Filed: Oct. 29, 2004

(51) Int. Cl.
    *F16H 37/08* (2006.01)
(52) U.S. Cl. ..................................... 475/206
(58) Field of Classification Search ............... 475/198, 475/206; 180/251, 248
    See application file for complete search history.

(56) References Cited

U.S. PATENT DOCUMENTS

| | | | |
|---|---|---|---|
| 5,334,116 A | 8/1994 | Baxter, Jr. | |
| 5,704,863 A | 1/1998 | Zalewski et al. | |
| 5,720,688 A | 2/1998 | Wilson et al. | |
| 5,738,604 A | 4/1998 | Dick | |
| 5,916,052 A | 6/1999 | Dick | |
| 6,554,731 B2 | 4/2003 | Brown et al. | |
| 6,572,506 B2 | 6/2003 | Williams et al. | |
| 2002/0035003 A1 | 3/2002 | Brown et al. | |

*Primary Examiner*—Dirk Wright
(74) *Attorney, Agent, or Firm*—Berenato, White & Stavish

(57) ABSTRACT

A torque vectoring gear drive apparatus for controlling drive torque distribution. The gear drive apparatus comprises an input shaft, first and second output shafts, a planetary interaxle differential unit for transmitting torque from the input shaft to the first and second output shafts, and a speed gear assembly provided for overriding said planetary interaxle differential unit. The planetary differential unit includes a planet carrier drivingly coupled to the input shaft and rotatably supporting at least one planet gear, a sun gear drivingly coupled to the at least one planet gear and a ring gear drivingly coupled the first output shaft, the sun gear drivingly coupled to the second output shaft. The speed gear assembly selectively couples the input shaft to the sun gear to define a first drive mode in which the sun gear is driven at a first speed.

29 Claims, 3 Drawing Sheets

TORQUE VECTORING GEAR DRIVE APPARATUS

BACKGROUND OF THE INVENTION

1. Field of the Invention

The present invention relates to power transfer systems for controlling drive torque distribution, and more particularly to a torque vectoring gear drive apparatus including a planetary differential unit and a speed gear assembly for selectively varying a gear transmission ratio between an input shaft and output shafts.

2. Description of the Prior Art

Four-wheel drive (4WD) motor vehicles are becoming increasingly popular, especially "full-time" four-wheel drive systems called in the art as all-wheel drive (AWD) systems. In such AWD systems, torque transfer cases are typically provided with an inter-axle differential for dividing torque between front wheels and rear wheels of the motor vehicle. The inter-axle differential enables the front wheels and the rear wheels to rotate at different speeds, which occurs during normal turning of the motor vehicle or in the event that the front wheels and the rear wheels have tires with different diameters. However, to prevent excessive slipping between the front and the rear wheels, as might occur when one set of wheels encounters a low-traction condition, such as ice, these transfer cases typically includes a selectively engageable clutch which is operative to lock the inter-axle differential upon sensing a predetermined amount of slippage between the front output shaft and the rear output shaft of the transfer case. Locking of the inter-axle differential prevents any relative slip or differentiation between the front output shaft and the rear output shaft of the transfer case.

Known prior AWD systems have generally required complex electronic sensors or other complex systems to monitor the slip or differentiation between the front output shaft and the rear output shaft or the front wheels and the rear wheels of a motor vehicle. Upon sensing slip or differentiation, an electronic control system determines whether the slip or differentiation being encountered is within a "normal" expected range or is "excessive." If the electronic control system indicates that the slip or differentiation being experienced is "excessive," the electronic control system causes the selectively engageable clutch to lock the inter-axle differential to preclude any further slip or differentiation.

Furthermore, currently many AWD vehicles are equipped with various vehicle stability systems, which helps correct vehicle understeer and/or oversteer to help keep the vehicle on course and avoid a collision. Typically, the known vehicle stability systems monitor the vehicle behavior based on a number of electronic sensors, and decrease engine power and/or selectively apply brakes to the appropriate wheels as needed for stabilizing the vehicle trajectory. More specifically, if road conditions cause your vehicle to understeer, the vehicle stability system decreases engine power to correct the problem. If the understeer is not reduced, the vehicle stability system applies brakes to the inside front wheel to help turn the car back onto its intended course. This reduction in understeer helps the vehicle regain traction to get it back on course. Alternatively, if the vehicle begins to oversteer, the vehicle stability system automatically helps correct the problem by applying brakes to the outside front wheel. This helps to reverse the potential spin and puts the vehicle back on track.

The electronic control system and the vehicle stability system of this type can be expensive to manufacture and maintain and a more cost-effective, simplified system of limiting slip differentiation between the front output shaft and the rear output shaft and the vehicle stability system of a four-wheel drive torque transfer case in a motor vehicle would be desirable. Moreover, while known transfer cases, including but not limited to those discussed above, have proven to be acceptable for various vehicular driveline applications, such devices are nevertheless susceptible to improvements that may enhance their performance and cost. With this in mind, a need exists to develop improved hydraulic transfer case of AWD vehicles that advance the art.

SUMMARY OF THE INVENTION

The present invention provides a gear drive apparatus for controlling drive torque distribution, such as in an all-wheel drive (AWD) or four-wheel drive (4WD) motor vehicle, including an internal combustion engine coupled through a transmission to the gear drive apparatus distributing engine torque between a first and second drive axle assemblies.

The gear drive apparatus of the present invention comprises an input shaft, first and second output shafts, a planetary interaxle differential unit disposed between the input shaft and the first and second output shafts for transmitting torque from the input shaft to the first and second output shafts and allowing the first and second output shafts to rotate differentially with respect to one another, and a speed gear assembly provided for overriding said planetary interaxle differential unit. More specifically, the planetary differential unit includes a planet carrier drivingly coupled to the input shaft and rotatably supporting at least one planet gear, a sun gear drivingly coupled to the at least one planet gear and a ring gear drivingly coupled the first output shaft, the sun gear drivingly coupled to the second output shaft.

The speed gear assembly selectively couples the input shaft to the sun gear to define a first drive mode in which the sun gear is driven at a first speed. Furthermore, the speed gear assembly may selectively couple the input shaft to the sun gear to define a second drive mode in which the sun gear is driven at a second speed.

Therefore, the selectively operable speed gear assembly for the AWD motor vehicles in accordance with the present invention represents a novel arrangement of the AWD torque transfer provided with the speed gear assembly allowing torque vectoring so as to speed up first output shaft while slow down the second output shaft, or, alternatively, slow down the first output shaft while speed up the second output shaft. Such an arrangement of the speed gear assembly helps correct vehicle understeer and/or oversteer to help keep the vehicle on course and avoid a collision.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
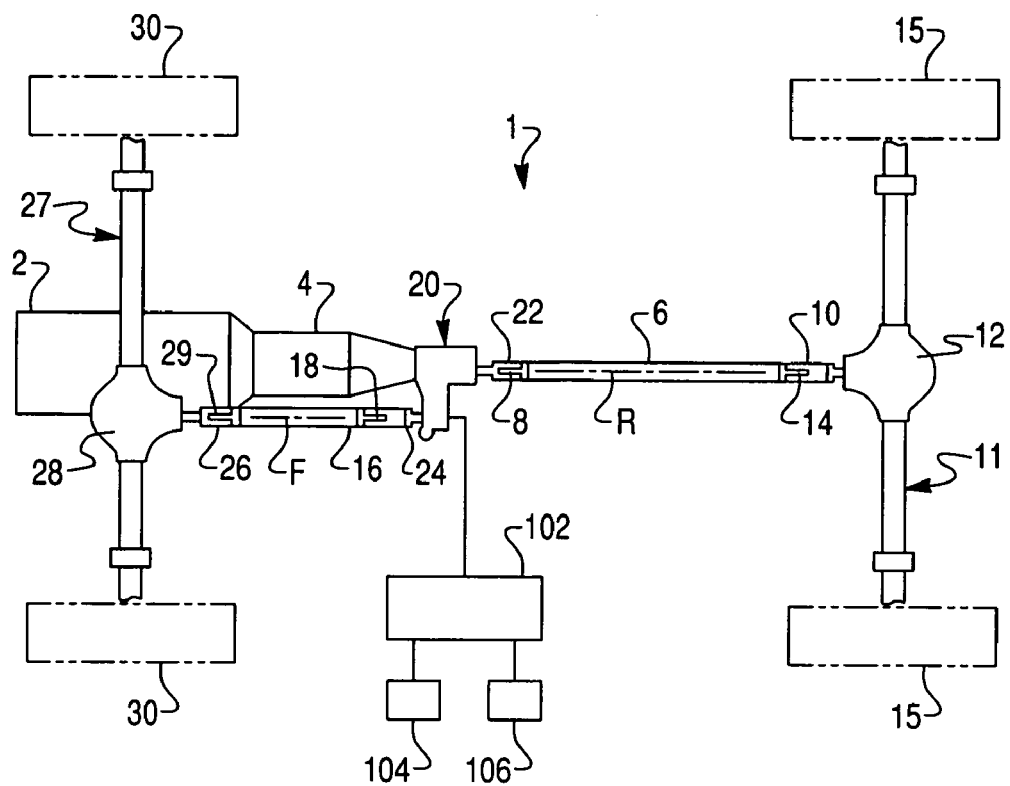
FIG. 1 is a schematic diagram showing a drivetrain of an all-wheel drive motor vehicle in accordance with a preferred embodiment of the present invention.

FIG. 1 schematically depicts a drivetrain 1 of an all-wheel drive (AWD) or four-wheel drive (4WD) motor vehicle in accordance with the present invention. The AWD drivetrain 1 comprises an internal combustion engine 2 (shown in phantom line) mounted to a front end of the motor vehicle and coupled to a transmission unit 4 (also shown in phantom line).

According to the preferred embodiment of the present invention, a torque transfer gear drive apparatus 20, commonly known in the art as or a transfer case, is secured to the rear of the transmission unit 4. The transmission unit 4 is provided with an output shaft that is coupled to an input shaft (referred to below in FIG. 2 as 34) of the transfer case 20. The transfer case 20 includes a rear coupling flange (or yoke) 22 that is coupled to a rear output shaft (referred to below in FIG. 2 as 36) of the transfer case 20 and connected to a forward end of a rear drive shaft 6 by means of a conventional universal joint coupling 8. The rearward end of the rear drive shaft 6 is coupled to an input shaft or yoke 10 of a rear differential 12 of a rear (first) axle assembly 11, by means of a universal joint coupling 14. The rear differential 12 is adapted to provide torque from the rear drive shaft 6 between rear wheels 15 (shown in phantom lines).

The transfer case 20 is further provided with a front coupling flange (or yoke) 24 that is coupled to a front output shaft (referred to below in FIG. 2 as 38) of the transfer case 20 and connected to the rearward end of a front drive shaft 16 by means of a universal joint coupling 18. The front drive shaft 16 has a forward end connected to an input shaft or yoke 26 of a front differential unit 28 of a front (second) axle assembly 27 by means of a universal joint coupling 29 and is adapted to divide torque received from the drive shaft 16 between the vehicle front wheels 30 (shown in phantom lines). When configured as described, the rear drive shaft 6 is adapted to rotate about an axis R, while the front drive shaft 16 is adapted to rotate about an axis F.

Figure 2:
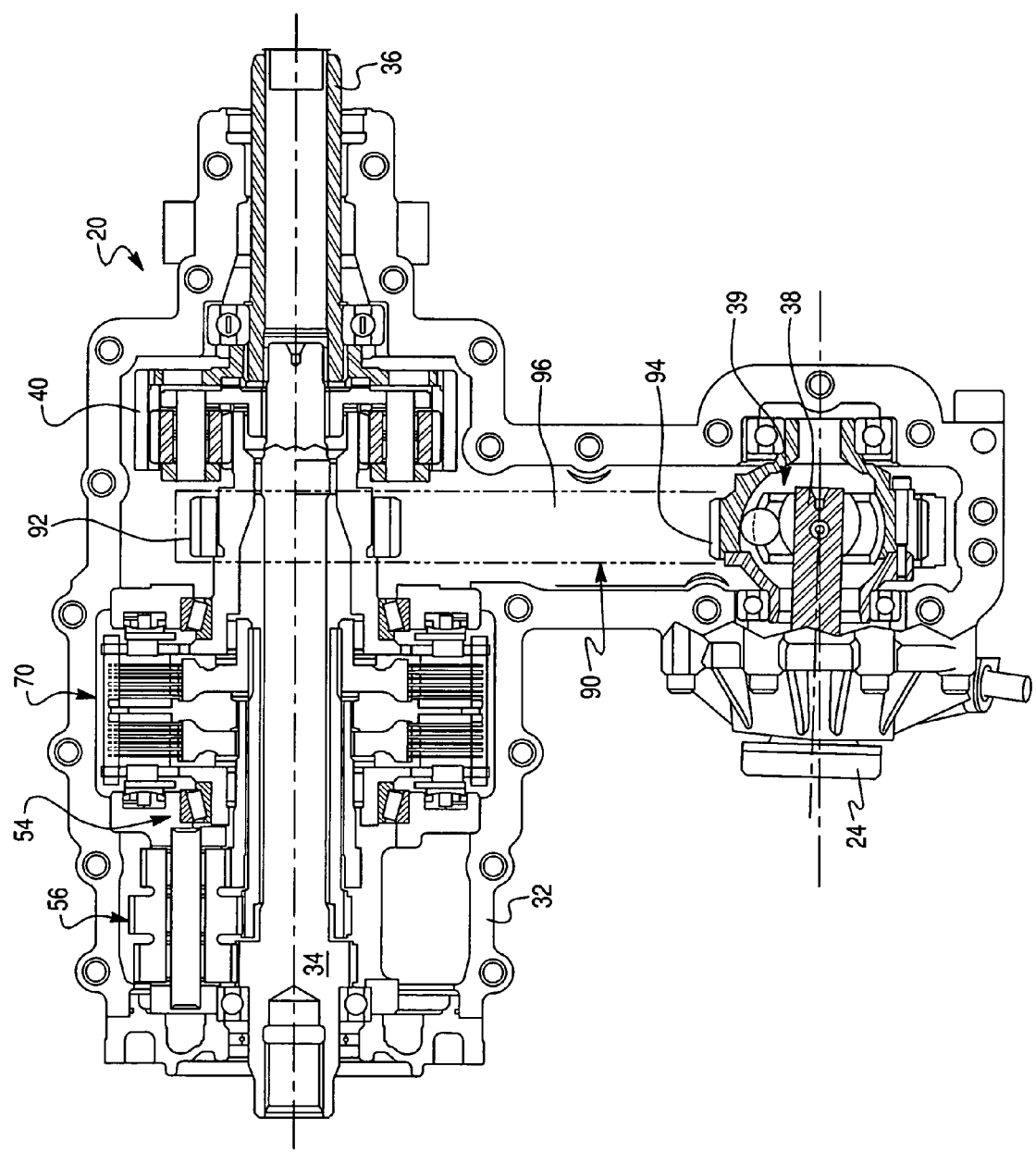
FIG. 2 is a sectional view of the transfer case in accordance with the preferred embodiment of the present invention.

The transfer case 20 is provided for dividing the drive torque originating from the transmission unit 4 between the rear and front propeller shafts 6 and 16, respectively. As illustrated in FIG. 2, the transfer case 20 comprises a hollow housing 32 secured to the transmission unit 4 (shown in FIG. 1), an input shaft 34 drivingly coupled to the output shaft of the transmission unit 4, a rear output shaft 36 drivingly coupled to the first axle assembly 11, and a front output shaft 38 drivingly coupled to the secondary axle assembly 27 and selectively drivingly connectable to the input shaft 34. The hollow housing 32 generally comprises more than one section, the sections being held together by conventional fastening means, such as bolts. The input shaft 34, the rear output shaft 36 and the front output shaft 38 are rotatably supported within the housing 32 by appropriate support means, such as antifriction rolling bearing assemblies or the like and the openings through which the shafts 34, 36 and 38 enter or exit the housing 32 will be provided with appropriate seal assemblies, as are well known in the prior art. Preferably, all connections between the shafts 34, 36 and 38 and component parts will be achieved through appropriate means, such as spline connections.

The transfer case 20 further comprises an interaxle planetary differential unit 40 and a speed gear assembly 54.

The planetary differential unit 40 is provided for dividing the drive torque of the input shaft 34 between the rear and front output shafts 36 and 38, respectively. As illustrated in detail in FIG. 3, the planetary differential unit 40 includes a planetary carrier 42 rotatably supporting at least one planet gear 44 through a carrier shaft 46, a ring gear 48 and a sun gear 50. The planet gear 44 is in mesh with both the ring gear 48 and the sun gear 50. Moreover, the planet carrier 42 is drivingly coupled to and driven by the input shaft 34. The sun gear 50 is drivingly coupled to the planet gear 44 and the ring gear 48 drivingly coupled the first output shaft 36. The sun gear 50 is drivingly coupled to the second output shaft 38.

Torque transfer from the sun gear 50 to the second output shaft 38 occurs through a drive assembly 90. Preferably, the drive assembly 90 is in the form of a chain drive assembly. Alternatively, gear drive assembly for transferring torque between the sun gear 50 and the second output shaft 38 may be employed. The chain drive assembly 90 includes an input sprocket 92 mounted about the input shaft 34, an output sprocket 94 mounted about the second output shaft 38, and an endless element 96 is provided to transmit a drive torque from the input sprocket 92 to the output sprocket 94. Preferably, the endless element 96 is a chain. It will be appreciated that any other types of the endless torque-transmitting elements known in the prior art, such as a toothed belt, flat belt, V-belt, etc., may be employed. As illustrated in FIG. 2, the input sprocket 92 is drivingly connected to a sleeve member 52 of the sun gear 50 by any known means, such as through a spline connection. The sleeve member 52 of the sun gear 50 is rotatably mounted about the input shaft 34. The output sprocket 94 is drivingly coupled to the second output shaft 38 through a CV joint 39. It will be appreciated that alternatively, the output sprocket 94 may be directly coupled to the second output shaft 38.

Furthermore, the distal end of the sleeve member 52 of the sun gear 50 is operatively connected to the speed gear assembly 54. Preferably, the speed gear assembly 54 is a dual-speed gear assembly. It will be appreciated that alternatively, the speed gear assembly 54 may provide more or less than two distinctive gear ratios. The dual-speed gear assembly 54 of the preferred embodiment of the present invention includes a gear set 56 and a clutch actuator 70.

The gear set 56 includes three integrally formed gears rotatably mounted on a gear shaft 57. More specifically, the gear set 56 includes a drive gear 58 in mesh with an input gear 35 integrally formed on the input shaft 34, and two output gears 60 and 62. The gears 58, 60 and 62 are non-rotatably connected to each other. It will be appreciated that the gear set 56 include more or less than two output gears. Moreover, the first output gear 60 is drivingly connected to a first sleeve shaft 64, while the second output gear 62 is drivingly connected to a second sleeve shaft 68. The gears 58, 60 and 62 have substantially different outer diameters and number of teeth, thus providing different gear ratios between the input shaft 34 and the first and second sleeve shafts 64 and 68.

The first and second sleeve shafts 64 and 68 are operatively connected to the clutch actuator 70. As further illustrated in FIG. 3, the clutch actuator 70 comprises a first friction clutch assembly 72 selectively actuated by a first hydraulic clutch activator 82, and a second friction clutch assembly 74 selectively actuated by a second hydraulic clutch activator 84. The hydraulic clutch actuators 82 and 84 are well known in the art and do not require detailed description. It will be appreciated that other appropriate types of the clutch actuators, such as electro-magnetic, electro-mechanical, etc., are within the scope of the present invention.

The first and second hydraulic clutch activators 82 and 84 are electronically controlled by an electronic control module (ECM) 102 (shown in FIG. 1) based on one or more vehicle parameters as control inputs 104, including but not limited to a vehicle speed, front and rear wheel speed, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The ECM 102 is also connected to a source of an electric power supply, such as an electric storage battery 106 mounted on the motor vehicle.

The clutch actuator 70 further comprises a substantially cylindrical casing 80 housing the first and second friction clutch assemblies 72 and 74, and drivingly connected to the distal end of the sleeve member 52 of the sun gear 50. Each of the first and second friction clutch assemblies 72 and 74 includes a friction clutch pack well known in the prior art that comprises sets of alternating outer friction plates and inner friction plates. Conventionally, an outer circumference of the outer friction plates of both first and second friction clutch assemblies 72 and 74 is provided with projections that non-rotatably engages corresponding grooves formed in the casing 80. An inner circumference of the inner friction plates of the first clutch assembly 72 is provided with projections that non-rotatably engage corresponding grooves formed in a first clutch ring 76 which, in turn, is non-rotatably coupled to the first sleeve shaft 64. Similarly, an inner circumference of the inner friction plates of the second clutch assembly 74 is provided with projections that non-rotatably engage corresponding grooves formed in a second clutch ring 78 which, in turn, is non-rotatably coupled to the second sleeve shaft 68. At the same time, both the outer friction plates and the inner friction plates are slideable in the axial direction to frictionally engage each other to form a torque coupling arrangement. Thus, the first clutch assembly 72 is provided to form the torque coupling arrangement between the first sleeve shaft 64 and the sun gear 50, while the second clutch assembly 74 is provided to form the torque coupling arrangement between the second sleeve shaft 68 and the sun gear 50.

Therefore, when the first clutch assembly 72 is engaged and the second clutch assembly 74 is disengaged, the transfer case 20 is in a first drive mode in which the speed gear assembly 54 overrides the interaxle differential unit 40 and the rotation from the input shaft 34 is transmitted to the sun gear 50 through a first gear train including the gears 35, 58, 60 and the first sleeve shaft 64, at a first gear ratio. In other words, in the first drive mode the sun gear 50 is driven at a first speed. Likewise, when the second clutch assembly 74 is engaged and the first clutch assembly 72 is disengaged, the transfer case 20 is in a second drive mode in which the speed gear assembly 54 overrides the interaxle differential unit 40 and the rotation from the input shaft 34 is transmitted to the sun gear 50 through a second gear train including the gears 35, 58, 62 and the second sleeve shaft 68, at a second gear ratio. In other words, in the second drive mode the sun gear 50 is driven at a second speed.

Figure 3:
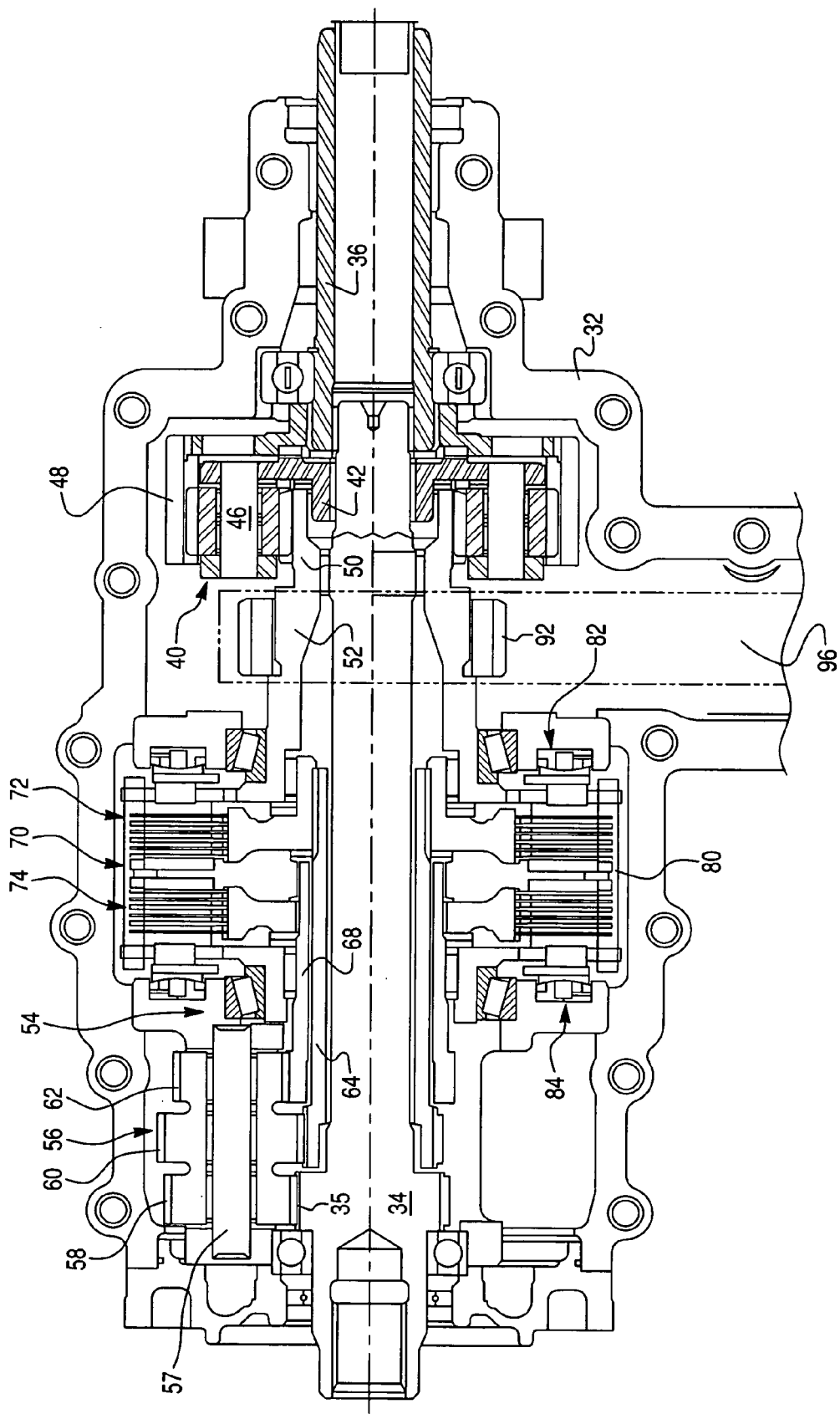
FIG. 3 is a partial sectional view of the transfer case of FIG. 2 showing an enlarged sectional view of a planetary differential unit and a speed gear assembly in accordance with the preferred embodiment of the present invention.

As further illustrated in FIG. 3, the diameter of the first output gear 60 is bigger than the diameter of the second output gear 62. Thus, the gear ratio of the gear set 56 in the first mode (the first gear ratio) is smaller than the gear ratio thereof in the second mode (the second gear ratio). Accordingly, the first speed of the sun gear 50 is bigger than the second speed thereof.

During normal operation mode, the clutch actuator 70 is in the "OFF" position, thus disabling both the first and second clutch assemblies 72 and 74. In this position, the input torque from the input shaft 34 is transferred to the planetary differential unit 40 through the planetary carrier 42. The planetary differential unit 40 then splits the input torque between the first output shaft 36 and the second output shaft 38 through the ring gear 48 and the sun gear 50, respectively, according to the gear ratio of the planetary unit 40.

In the first drive mode of the transfer case 20, the first clutch assembly 72 is engaged and the second clutch assembly 74 is disengaged. Consequently, the speed gear assembly 54 overrides the interaxle differential unit 40 and the torque from the input shaft 34 is transmitted to the sun gear 50 through the gears 35, 58, 60 and the first sleeve shaft 64 at the first speed ratio. This effectively overrides the interaxle differential unit 40. Thus, in the first drive mode, the input torque is delivered to the sun gear 50 and, subsequently, to the second output axle 38, through the first gear train of the speed gear assembly 54 at the first gear ratio that increases the speed of the second output shaft 38 relative to the normal operation mode.

In the second drive mode of the transfer case 20, the second clutch assembly 74 is engaged and the first clutch assembly 72 is disengaged. Consequently, the speed gear assembly 54 overrides the interaxle differential unit 40 and the torque from the input shaft 34 is transmitted to the sun gear 50 through the gears 35, 58, 62 and the second sleeve shaft 68 at the second speed ratio. Again, this effectively overrides the interaxle differential unit 40. Thus, in the second drive mode, the input torque is delivered to the sun gear 50 and, subsequently, to the second output axle 38, through the second gear train of the speed gear assembly 54 at the second gear ratio that decreases the speed of the second output shaft 38 relative to the normal operation mode.

Therefore, engaging one of the clutch assemblies 72 or 74, the speed gear assembly 54 either speeds up or slows down the sun gear 50 depending upon which clutch assembly is engaged. More specifically, in the first drive mode when the first clutch assembly 72 is engaged, the sun gear 50, thus the second (front) output shaft 38, is sped up, while the ring gear 48, thus the first output shaft 36, is slowed down. Alternatively, in the second drive mode when the second clutch assembly 74 is engaged, the sun gear 50, thus the second output shaft 38, is slowed down, while the ring gear 48, thus the first output shaft 36, is sped up.

Therefore, the speed gear assembly 54 allows vectoring the torque. The amount of the increase or decrease in the speed or torque to the sun gear 50 is dependent upon the gear ratio of the speed gear assembly 54.

The engagement of the first and second clutch assemblies 72 or 74 is provided by the first and second hydraulic clutch activators 82 and 84, respectively, which, in turn, are electronically controlled by the ECM 102 (shown in FIG. 1) based on one or more vehicle parameters as the control inputs 104.

More specifically, if the control inputs 104 determine that the motor vehicle starts exhibiting oversteer, the ECM 102 switches the speed gear assembly 54 of the transfer case 20 to the first drive mode. Consequently, the first clutch assembly 72 is engaged, and the sun gear 50, thus the second (front) output shaft 38, is sped up, while the ring gear 48, thus the first output shaft 36, is slowed down. This helps to reverse the potential spin and puts the vehicle back on track.

Alternatively, if the control inputs 104 determine that the motor vehicle begins to understeer, the ECM 102 switches the speed gear assembly 54 of the transfer case 20 to the second drive mode. Consequently, the first clutch assembly 72 is disengaged and the second clutch assembly 74 is engaged, and the sun gear 50, thus the second (front) output shaft 38, is slowed down, while the ring gear 48, thus the first output shaft 36, is sped up to reduce the understeer. This reduction in understeer helps the vehicle to stabilize the vehicle trajectory Therefore, the selectively operable transfer case for the AWD motor vehicles in accordance with the present invention represents a novel arrangement of the AWD transfer case provided with the speed gear assembly allowing torque vectoring so as to speed up first output shaft while slow down the second output shaft, or, alternatively, slow down the first output shaft while speed up the second output shaft. Such an arrangement of the transfer case helps correct vehicle understeer and/or oversteer to help keep the vehicle on course and avoid a collision.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A gear drive apparatus comprising:
an input shaft;
first and second output shafts;
a planetary differential unit for transmitting torque from said input shaft to said first and second output shafts and allowing said first and second output shafts to rotate differentially with respect to one another;
said planetary differential unit including a planet carrier drivingly coupled to said input shaft and rotatably supporting at least one planet gear, a sun gear drivingly coupled to said at least one planet gear and a ring gear drivingly coupled said first output shaft, said sun gear drivingly coupled to said second output shaft; and
a speed gear assembly provided for overriding said planetary differential unit by selectively coupling said input shaft to said sun gear to define a first drive mode in which said sun gear is driven at a first speed.

2. A gear drive apparatus as comprising:
an input shaft;
first and second output shafts;
a planetary differential unit for transmitting torque from said input shaft to said first and second output shafts and allowing said first and second output shafts to rotate differentially with respect to one another;
said planetary differential unit including a planet carrier drivingly coupled to said input shaft and rotatably supporting at least one planet gear, a sun gear drivingly coupled to said at least one planet gear and a ring gear drivingly coupled said first output shaft, said sun gear drivingly coupled to said second output shaft; and
a speed gear assembly provided for overriding said planetary differential unit by selectively coupling said input shaft to said sun gear to define a first drive mode in which said sun gear is driven at a first speed and a second drive mode in which said sun gear is driven at a second speed.

3. The gear drive apparatus as defined in claim 1, further comprising a hollow housing rotatably supporting said input shaft and said first and second output shafts therein.

4. The gear drive apparatus as defined in claim 1, wherein said speed gear assembly includes a gear set and a clutch actuator.

5. The gear drive apparatus as defined in claim 4, wherein said gear set includes a drive gear in mesh with an input gear non-rotatably connected to said input shaft, a first output gear non-rotatably connected to said drive gear and a first sleeve shaft being in mesh with said first output gear; a gear train including said input gear, said drive gear, said first output gear and said first sleeve shaft define said first drive mode.

6. The gear drive apparatus as defined in claim 5, wherein said clutch actuator includes a first clutch assembly provided for selectively coupling said first sleeve shaft to said sun gear to engage said gear drive apparatus in said first drive mode.

7. The gear drive apparatus as defined in claim 6, wherein said first clutch assembly is a friction clutch assembly comprising at least one first member coupled to rotate with said first sleeve shaft and at least one second member coupled to rotate with said sun gear, said first and second members being frictionally engageable with one another.

8. The gear drive apparatus as defined in claim 7, wherein said first clutch assembly includes a clutch activator for selectively frictionally loading said first friction clutch assembly.

9. The gear drive apparatus as defined in claim 8, wherein said clutch activator is a hydraulic clutch actuator.

10. The gear drive apparatus as defined in claim 2, wherein said speed gear assembly includes a gear set and a clutch actuator.

11. The gear drive apparatus as defined in claim 10, wherein said gear set includes first and second gear trains; the first gear train includes a drive gear in mesh with an input gear non-rotatably connected to said input shaft, a first output gear non-rotatably connected to said drive gear and a first sleeve shaft being in mesh with said first output gear; said first gear train defines said first drive mode; said second gear train includes a second output gear non-rotatably connected to said drive gear and a second sleeve shaft being in mesh with said second output gear; said second gear train defines said second drive mode.

12. The gear drive apparatus as defined in claim 1 wherein said clutch actuator includes a first clutch assembly provided for selectively coupling said first sleeve shaft to said sun gear to engage said gear drive apparatus in said first drive mode and a second clutch assembly provided for selectively coupling said second sleeve shaft to said sun gear to engage said gear drive apparatus in said second drive mode.

13. The gear drive apparatus as defined in claim 12, wherein each of said first and second clutch assemblies is a friction clutch assembly comprising at least one first member coupled to rotate with one of said first and second sleeve shafts and at least one second member coupled to rotate with said sun gear, said first and second members being frictionally engageable with one another.

14. The gear drive apparatus as defined in claim 13, wherein each of said first and second clutch assemblies includes a clutch activator for selectively frictionally loading corresponding one of said first and second friction clutch assemblies.

15. The gear drive apparatus as defined in claim 14, wherein said clutch activator is a hydraulic clutch actuator.

16. The gear drive apparatus as defined in claim 1, further comprising:
   an input member operatively coupled to said planetary differential unit;
   an output member drivingly connected to said second output shaft; and
   a mechanism for transmitting torque from said input member to said output member.

17. The gear drive apparatus as defined in claim 16, wherein said input member is drivingly coupled to said sun gear.

18. The gear drive apparatus as defined in claim 16, wherein each of said input and output members is in the form of a sprocket, and wherein said mechanism for transmitting torque from said input member to said output member is in the form of an endless element transmitting torque from said input sprocket to said output sprocket.

19. A transfer case for distributing torque between first and second axles of a motor vehicle, said transfer case comprising:
   an input shaft coupled to a vehicle transmission to be rotatably driven thereby;
   a first output shaft for transmitting torque to said first drive axle of the vehicle;
   a second output shaft for transmitting torque to said second drive axle of the vehicle;
   a planetary interaxle differential unit disposed between said input shaft and said first and second output shafts for transmitting torque from said input shaft to said first and second output shafts and allowing said first and second output shafts to rotate differentially with respect to one another;
   said planetary differential unit including a planet carrier drivingly coupled to said input shaft and rotatably supporting at least one planet gear, a sun gear drivingly coupled to said at least one planet gear and a ring gear drivingly coupled said first output shaft, said sun gear drivingly coupled to said second output shaft; and
   a speed gear assembly provided for overriding said planetary interaxle differential unit by selectively coupling said input shaft to said sun gear to define a first drive mode in which said sun gear is driven at a first speed and a second drive mode in which said sun gear is driven at a second speed.

20. The transfer case as defined in claim 19, further comprising a hollow housing rotatably supporting said input shaft and said first and second output shafts therein.

21. The transfer case as defined in claim 19, wherein said speed gear assembly includes a gear set and a clutch actuator.

22. The transfer case as defined in claim 21, wherein said gear set includes first and second gear trains; the first gear train includes a drive gear in mesh with an input gear non-rotatably connected to said input shaft, a first output gear non-rotatably connected to said drive gear and a first sleeve shaft being in mesh with said first output gear; said first gear train defines said first drive mode; said second gear train includes a second output gear non-rotatably connected to said drive gear and a second sleeve shaft being in mesh with said second output gear; said second gear train defines said second drive mode.

23. The transfer case as defined in claim 22, wherein said clutch actuator includes a first clutch assembly provided for selectively coupling said first sleeve shaft to said sun gear to engage said transfer case in said first drive mode and a second clutch assembly provided for selectively coupling said second sleeve shaft to said sun gear to engage said transfer case in said second drive mode.

24. The transfer case as defined in claim 23, wherein each of said first and second clutch assemblies is a friction clutch assembly comprising at least one first member coupled to rotate with one of said first and second sleeve shafts and at least one second member coupled to rotate with said sun gear, said first and second members being frictionally engageable with one another.

25. The transfer case as defined in claim 24, wherein each of said first and second clutch assemblies includes a clutch activator for selectively frictionally loading corresponding one of said first and second friction clutch assemblies.

26. The transfer case as defined in claim 25, wherein said clutch activator is a hydraulic clutch actuator.

27. The transfer case as defined in claim 19, further comprising:
   an input member operatively coupled to said planetary differential unit;
   an output member drivingly connected to said second output shaft; and
   a mechanism for transmitting torque from said input member to said output member.

28. The transfer case as defined in claim 19, wherein said input member is drivingly coupled to said sun gear.

29. The transfer case as defined in claim 19, wherein each of said input and members is in the form of a sprocket, and wherein said mechanism for transmitting torque from said input member to said output member is in the form of an endless element transmitting torque from said input sprocket to said output sprocket.

* * * * *